(12) United States Patent
Nitta

(10) Patent No.: US 12,047,698 B2
(45) Date of Patent: Jul. 23, 2024

(54) IMAGE PROCESSING DEVICE AND IMAGE PROCESSING METHOD

(71) Applicant: SONY GROUP CORPORATION, Tokyo (JP)

(72) Inventor: Ryuichiro Nitta, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 169 days.

(21) Appl. No.: 17/753,780

(22) PCT Filed: Jul. 15, 2020

(86) PCT No.: PCT/JP2020/027460
§ 371 (c)(1),
(2) Date: Mar. 14, 2022

(87) PCT Pub. No.: WO2021/053948
PCT Pub. Date: Mar. 25, 2021

(65) Prior Publication Data
US 2022/0377271 A1    Nov. 24, 2022

(30) Foreign Application Priority Data

Sep. 20, 2019    (JP) .................. 2019-171405

(51) Int. Cl.
*H04N 25/75* (2023.01)
*H04N 25/771* (2023.01)
*H04N 25/772* (2023.01)

(52) U.S. Cl.
CPC ........... *H04N 25/75* (2023.01); *H04N 25/771* (2023.01); *H04N 25/772* (2023.01)

(58) Field of Classification Search
None
See application file for complete search history.

(56) References Cited

U.S. PATENT DOCUMENTS 6,157,676 A * 12/2000 Takaoka ............... H04N 19/593
375/E7.266
2012/0042149 A1    2/2012 Sharma et al.
(Continued)

FOREIGN PATENT DOCUMENTS

CN    104603834 A    5/2015
EP    2399258 A1    12/2011
(Continued)

OTHER PUBLICATIONS

International Search Report and Written Opinion of PCT Application No. PCT/JP2020/027460, issued on Sep. 24, 2020, 08 pages of ISRWO.

*Primary Examiner* — Cynthia Segura
(74) *Attorney, Agent, or Firm* — CHIP LAW GROUP

(57) ABSTRACT

The memory control unit 12 causes a memory unit 13 to store input image data divided into a first block having pixel data of a predetermined number of pixels in a line direction for a plurality of lines, a second block having pixel data of a predetermined number of pixels following the first block in the line direction for a plurality of lines including a part of the lines of the first block, and a third block having pixel data of a predetermined number of pixels following in the line direction for a plurality of lines including a line different from the line included in the second block in the first block. The arithmetic processing unit 15 calculates an interpolation position that is a position before image conversion corresponding to a pixel position after image conversion, the memory control unit 12 reads the pixel data of the first to third blocks including the pixel data of the peripheral pixel of the interpolation position from the memory unit 13, and the interpolation processing unit 14 generates the pixel data of the interpolation position by the interpolation processing (Continued)

using the read peripheral pixel. The processing speed of the image processing can be improved.

12 Claims, 10 Drawing Sheets

(56) References Cited

U.S. PATENT DOCUMENTS

| | | | |
|---|---|---|---|
| 2013/0236118 A1 | 9/2013 | Takahashi | |
| 2014/0071146 A1* | 3/2014 | Sanghvi | ............... H04N 19/433 |
| | | | 345/557 |

FOREIGN PATENT DOCUMENTS

| | | | |
|---|---|---|---|
| JP | 2011-199804 A | 10/2011 | |
| JP | 2012-518831 A | 8/2012 | |
| JP | 2012-238118 A | 12/2012 | |
| JP | 2013-186624 A | 9/2013 | |
| JP | 2015-534169 A | 11/2015 | |
| KR | 10-2011-0121641 A | 11/2011 | |
| WO | 2010/095944 A1 | 8/2010 | |
| WO | 2014/039969 A1 | 3/2014 | |

* cited by examiner

|  | BLK1 | BLK2 |
|---|---|---|
|  | BX1=INT(PSH/4)<br>BY1=INT(PMV/2) | BX2=(INT(PSH/4))+1<br>BY2=INT(PMV/2) |
|  |  | BX3=(INT(PSH/4))+1<br>BY3=(INT(PMV/2))+1 |
|  |  | BLK3 |

FIG. 8B

|  | BLK2 | BLK1 |
|---|---|---|
|  | BX2=INT(PSH/4)<br>BY2=INT(PMV/2) | BX1=(INT(PSH/4))+1<br>BY1=INT(PMV/2) |
|  | BX3=INT(PSH/4)<br>BY3=(INT(PMV/2))+1 |  |
|  | BLK3 |  |

FIG. 8C

|  | BLK2 |  |
|---|---|---|
|  | BX2=INT(PSH/4)<br>BY2=INT(PMV/2) |  |
|  | BX3=INT(PSH/4)<br>BY3=(INT(PMV/2))+1 | BX1=(INT(PSH/4))+1<br>BY1=(INT(PMV/2))+1 |
|  | BLK3 | BLK1 |

FIG. 8D

|  |  | BLK2 |
|---|---|---|
|  |  | BX2=(INT(PSH/4))+1<br>BY2=INT(PMV/2) |
|  | BX1=INT(PSH/4)<br>BY1=(INT(PMV/2))+1 | BX3=(INT(PSH/4))+1<br>BY3=(INT(PMV/2))+1 |
|  | BLK1 | BLK3 |

IMAGE PROCESSING DEVICE AND IMAGE PROCESSING METHOD

CROSS REFERENCE TO RELATED APPLICATIONS

This application is a U.S. National Phase of International Patent Application No. PCT/JP2020/027460 filed on Jul. 15, 2020, which claims priority benefit of Japanese Patent Application No. JP 2019-171405 filed in the Japan Patent Office on Sep. 20, 2019. Each of the above-referenced applications is hereby incorporated herein by reference in its entirety.

TECHNICAL FIELD

This technology relates to an image processing device, an image processing method, and a program, and makes it possible to improve a processing speed of image processing.

BACKGROUND ART

In conventional image processing, for example, image enlargement-reduction processing, rotation processing, deformation processing, and the like are performed, and Patent Document 1 proposes use of cache technology to improve processing speed.

CITATION LIST

Patent Document

Patent Document 1: Japanese Patent Application Laid-Open No. 2012-238118

SUMMARY OF THE INVENTION

Problems to be Solved by the Invention

Incidentally, in a case of using the cache technology, for example, if it takes time to read necessary image data from image data cached in a memory, the processing speed cannot be improved sufficiently.

Therefore, an object of this technology is to provide an image processing device, an image processing method, and a program capable of improving a processing speed of image processing.

Solutions to Problems

A first aspect of the present technology resides in an image processing device including:
  a memory unit that stores input image data divided into a first block having pixel data of a predetermined number of pixels in a line direction for a plurality of lines, a second block having pixel data of a predetermined number of pixels following the first block in the line direction for a plurality of lines including a part of the lines of the first block, and a third block having pixel data of a predetermined number of pixels following the first block in the line direction for a plurality of lines including a line different from the line included in the second block in the first block; and
  a memory control unit that reads the pixel data of the first, second, and third blocks including pixel data of a peripheral pixel to be used in generating pixel data of an interpolation position from the memory unit.

In the present technology, the memory unit stores input image data divided into a first block having pixel data of a predetermined number of pixels in a line direction for a plurality of lines, a second block having pixel data of a predetermined number of pixels following the first block in the line direction for a plurality of lines including a part of the lines of the first block, and a third block having pixel data of a predetermined number of pixels following the first block in the line direction for a plurality of lines including a line different from the line included in the second block in the first block. The predetermined number of pixels in the line direction is, for example, equal to or more than the number of pixels in the line direction of peripheral pixels to be used in the interpolation processing, and the first block includes all lines of peripheral pixels to be used in the interpolation processing. Furthermore, the memory unit is provided with three areas, and input image data divided into blocks is stored in respective areas.

The memory control unit includes a read address generation unit that generates a read address to read the pixel data of the peripheral pixel to be used in generating pixel data of the interpolation position, and a read address conversion processing unit that converts the read address generated by the read address generation unit into an address in block units. Furthermore, the memory control unit may include a read image data processing unit that selects pixel data of the peripheral pixel from the pixel data of the first, second, and third blocks read from the memory unit and outputs the pixel data to an interpolation processing unit.

The memory control unit reads the pixel data of the first, second, and third blocks including the pixel data of the peripheral pixel from the memory unit using the address obtained by the read address conversion processing unit. Here, in a case where the first block, the second block, and the third block are stored in three banks, pixel data of each block is read from different banks by burst transfer. Furthermore, the memory control unit may read, from the memory unit, pixel data of a block including pixel data of a peripheral pixel in a case where the interpolation position is a position where the pixel data of the peripheral pixel is included only in one of the first, second, and third blocks, and read, from the memory unit, pixel data of two blocks including pixel data of the peripheral pixel in a case where the interpolation position is a position where the pixel data of the peripheral pixel is included in two blocks of the first, second, and third blocks.

Moreover, the memory control unit may include a write image data processing unit that divides the input image data into data of the first block, data of the second block, and data of the third block, and a write address generation unit that generates a write address to write the input image data processed as block units by the write image processing unit in the memory unit in block units.

Furthermore, the image processing device may further include an arithmetic processing unit that calculates the interpolation position that is a pixel position before image conversion corresponding to a pixel position after image conversion, and an interpolation processing unit that performs interpolation processing using pixel data of a peripheral pixel read from the memory unit by the memory control unit and generates pixel data of the interpolation position. Furthermore, data amounts of the first, second, and third blocks may be equal to a data width of the memory unit.

A second aspect of the present technology resides in an image processing method including
  reading, by a memory control unit, from a memory unit that stores input image data divided into a first block having pixel data of a predetermined number of pixels in a line direction for a plurality of lines, a second block having pixel data of a predetermined number of pixels following the first block in the line direction for a plurality of lines including a part of the lines of the first block, and a third block having pixel data of a predetermined number of pixels following the first block in the line direction for a plurality of lines including a line different from the line included in the second block in the first block, the pixel data of the first, second, and third blocks including pixel data of a peripheral pixel to be used in generating pixel data of an interpolation position.

A third aspect of the present technology resides in a program for causing a computer to execute image conversion, the program causing the computer to execute:

a procedure of calculating an interpolation position that is a pixel position before image conversion corresponding to a pixel position after image conversion;

a procedure of reading, from a memory unit that stores input image data divided into a first block having pixel data of a predetermined number of pixels in a line direction for a plurality of lines, a second block having pixel data of a predetermined number of pixels following the first block in the line direction for a plurality of lines including a part of the lines of the first block, and a third block having pixel data of a predetermined number of pixels following the first block in the line direction for a plurality of lines including a line different from the line included in the second block in the first block, the pixel data of the first, second, and third blocks including pixel data of a peripheral pixel to be used in generating pixel data of the interpolation position; and a procedure of performing interpolation processing using pixel data of a peripheral pixel read from the memory unit and generating the pixel data of the interpolation position.

Note that the program of the present technology is, for example, a program that can be provided to a general-purpose computer capable of executing various program codes by a storage medium provided in a computer-readable format, a communication medium, for example, a storage medium such as an optical disk, a magnetic disk, or a semiconductor memory, or a communication medium such as a network. By providing such a program in a computer-readable format, processing corresponding to the program is implemented on the computer.

BRIEF DESCRIPTION OF DRAWINGS

FIGS. 6A, 6B, 6C, 6D, and 6E are diagrams illustrating specific examples of input image data and blocks.

FIGS. 8A, 8B, 8C, and 8D are diagrams illustrating addresses of three blocks.

FIGS. 9A and 9B are diagrams illustrating a relationship between an interpolation position at which pixel data is generated and a block from which data is read.

FIGS. 10A and 10B are diagrams illustrating a case where interpolation processing can be performed by reading data of one block or two blocks.

MODE FOR CARRYING OUT THE INVENTION

Hereinafter, a mode for carrying out the present technology will be described. Note that the description will be made in the following order.

1. Configuration of embodiment
2. Operation of embodiment
2-1. Image data writing operation
2-2. Image data reading operation
3. Modification example

1. CONFIGURATION OF EMBODIMENT

An image processing device of the present technology causes image data before image processing to be sequentially stored in a frame memory, reads the image data stored in the frame memory according to image conversion, for example, enlargement, reduction, movement, deformation, or the like of an image, and generates image data after image conversion.

Figure 1:
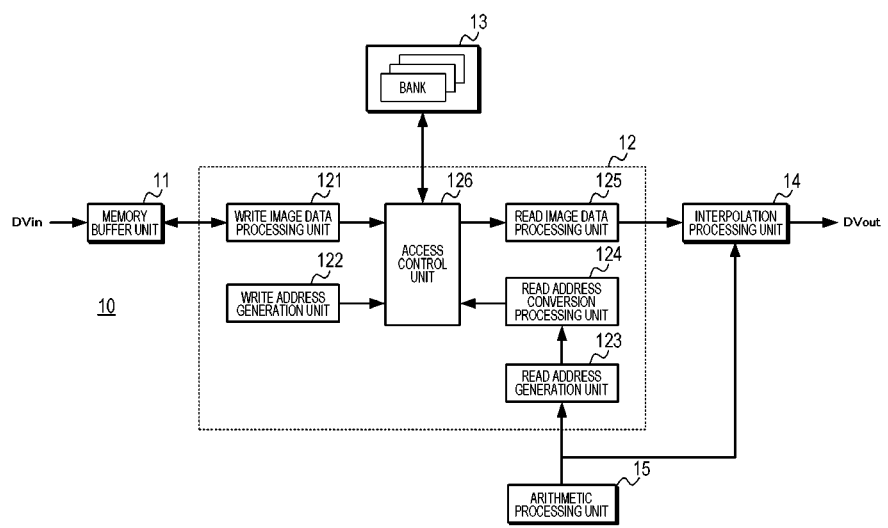
FIG. 1 is a diagram illustrating a configuration of an image processing device.

FIG. 1 illustrates a configuration of the image processing device. The image processing device 10 includes a memory buffer unit 11, a memory control unit 12, a memory unit 13, an interpolation processing unit 14, and an arithmetic processing unit 15. Note that the units constituting the image processing device 10 may be provided integrally, and the interpolation processing unit 14 and the arithmetic processing unit 15 may be provided separately from the memory control unit 12 and the memory unit 13.

The memory buffer unit 11 is configured using a line memory or a frame memory. The memory buffer unit 11 temporarily stores input image data DVin in the line memory or the frame memory. Furthermore, the input image data DVin temporarily stored in the memory buffer unit 11 is read by the memory control unit 12 and stored in the memory unit 13.

The memory control unit 12 acquires image data from the memory buffer unit 11 and causes the image data to be stored in the memory unit 13. Furthermore, the memory control unit 12 reads, from the memory unit 13, pixel data of peripheral pixels necessary for generating the pixel data of the interpolation position notified from the arithmetic processing unit 15, and outputs the pixel data to the interpolation processing unit 14.

The memory control unit 12 has a write image data processing unit 121, a write address generation unit 122, a read address generation unit 123, a read address conversion processing unit 124, a read image data processing unit 125, and an access control unit 126.

The write image data processing unit 121 converts the image data of the memory buffer unit 11 into data in a processing unit stored in the memory unit 13. The write image data processing unit 121 performs conversion into data of block units by dividing the image data into a first block having pixel data of a predetermined number of pixels in a line direction by a plurality of lines, a second block having pixel data of a predetermined number of pixels following the first block in the line direction, for a plurality of lines including a part of the lines of the first block, and a third block having pixel data of a predetermined number of pixels following the first block in the line direction for a plurality of lines including a line different from the line included in the second block in the first block.

The write address generation unit 122 generates a write address for writing data in a processing unit that is output from the write image data processing unit 121 to the memory unit 13. The write address generation unit 122 generates a write address for writing, in block units, data in block units output from the write image data processing unit 121 to the memory unit 13.

The read address generation unit 123 generates a read address for reading pixel data of peripheral pixels used for generating pixel data of an interpolation position.

The read address conversion processing unit 124 converts the read address generated by the read address generation unit 123 into an address of data in processing units, that is, an address of a block including pixel data of peripheral pixels indicated by the read address.

The read image data processing unit 125 selects pixel data of peripheral pixels to be used in interpolation processing from the image data read from the memory unit 13, and outputs the pixel data to the interpolation processing unit 14.

The access control unit 126 buffers the image data, the address data, and the like and arbitrates or controls access at a time of accessing the memory unit 13.

The memory unit 13 is configured using a dynamic random access memory (DRAM) or a static random access memory (SRAM). For example, in a case where a large-capacity DRAM with a low price is used, the same data is stored in a plurality of banks in order to enable random access with a small delay, and bank switching is performed in a case where desired data is read. That is, the input image data converted into data in block units is stored in three banks, and the pixel data of the first, second, and third blocks is read from different banks in block units. Furthermore, in a case of using the SRAM, the same data is stored in a plurality of regions, and the regions are switched in a case where desired data is read.

The interpolation processing unit 14 performs interpolation processing on the basis of pixel data of the peripheral pixels read from the memory unit 13 and an interpolation position notified from the arithmetic processing unit 15, and generates pixel data of the interpolation position.

The arithmetic processing unit 15 calculates which position before image conversion the pixel position after image conversion is, and outputs the interpolation position, which is the calculated pixel position, to the memory control unit 12, so as to read data of a block including the pixel data of the peripheral pixels of the interpolation position from the memory unit 13. Furthermore, the arithmetic processing unit 15 outputs the interpolation position to the interpolation processing unit 14 to generate pixel data of the interpolation position. Moreover, the arithmetic processing unit 15 calculates the interpolation position for each pixel position after image conversion, and outputs the interpolation position to the memory control unit 12 and the interpolation processing unit 14. Therefore, pixel data is generated for each pixel position after image conversion, and the image data DVout after image conversion is output from the interpolation processing unit 14.

2. OPERATION OF EMBODIMENT

Figure 2A:
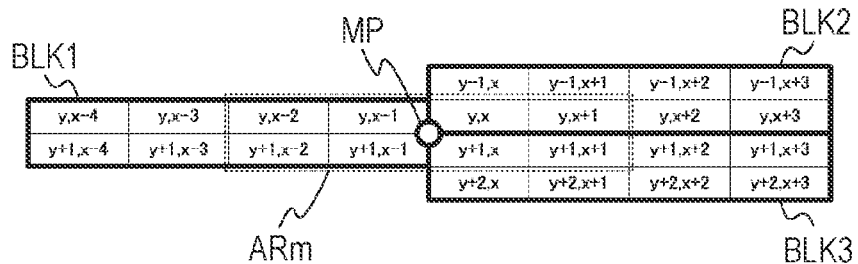
FIGS. 2A, 2B, and 2C are diagrams illustrating a relationship between peripheral pixels and blocks obtained by dividing input image data with respect to an interpolation position.
Figure 2B:
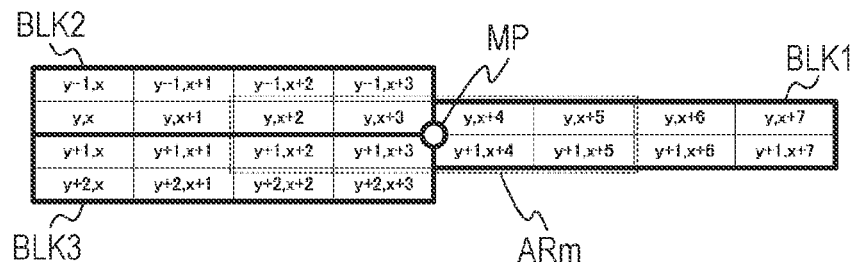
Figure 2C:
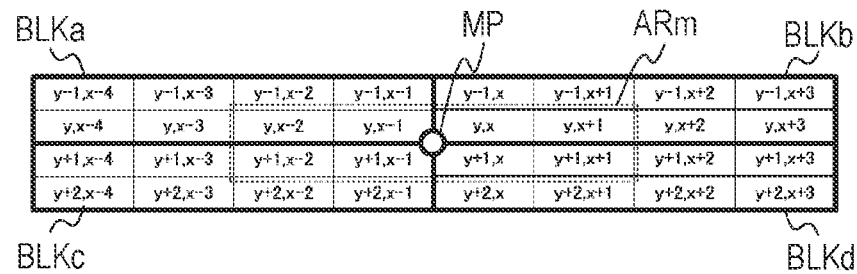

Next, an operation of the embodiment will be described. Note that in the operation of the embodiment, a case where a DRAM is used will be illustrated. FIGS. 2A, 2B, and 2C illustrate a relationship between peripheral pixels and blocks obtained by dividing input image data with respect to an interpolation position. For example, pixels included in a pixel region ARm of "2 lines×4 pixels" with reference to an interpolation position MP (pixel position indicated by a white circle) are assumed as peripheral pixels. Further, the block size is set such that the number of pixels in the line direction is equal to or larger than the number of pixels in the line direction of the peripheral pixels, and the first block includes all lines of the peripheral pixels to be used in the interpolation processing, and for example, the block size of the first block is "2 lines×4 pixels". Furthermore, the block size of the second block having pixel data of a predetermined number of pixels following the first block in the line direction for a plurality of lines including a part of the lines of the first block is, for example, "2 lines×4 pixels". Moreover, the block size of the third block having pixel data of a predetermined number of pixels following the first block in the line direction for a plurality of lines including a line different from the line included in the second block in the first block is, for example, "2 lines×4 pixels".

In this case, as illustrated in FIG. 2A, the first block BLK1 includes pixel data "(y, x−4), (y, x−3), (y, x−2), (y, x−1), (y+1, x−4), (y+1, x−3), (y+1, x−2), and (y+1, x−1)" for four pixels in the line direction and two lines.

Furthermore, the second block BLK2 includes pixel data "(y−1, x), (y−1, x+1), (y−1, x+2), (y−1, x+3), (y, x), (y, x+1), (y, x+2), and (y, x+3)" for four pixels in the line direction following the first block BLK1 and two lines including one line of the first block BLK1.

Furthermore, the third block BLK3 includes pixel data "(y+1, x), (y+1, x+1), (y+1, x+2), (y+1, x+3), (y+2, x), (y+2, x+1), (y+2, x+2), and (y+2, x+3)" for four pixels in the line direction following the first block BLK1 and two lines including a line different from the line in the first block BLK1 included in the second block BLK2.

Furthermore, as illustrated in (b) of FIG. 2B, the first block BLK1 includes pixel data "(y, x+4), (y, x+5), (y, x+6), (y, x+7), (y+1, x+4), (y+1, x+5), (y+1, x+6), and (y+1, x+7)" for four pixels in the line direction and two lines.

Furthermore, the second block BLK2 includes pixel data "(y−1, x), (y−1, x+1), (y−1, x+2), (y−1, x+3), (y, x), (y, x+1), (y, x+2), and (y, x+3)" for four pixels in the line direction following the first block BLK1 and two lines including one line of the first block BLK1.

Furthermore, the third block BLK3 includes pixel data "(y+1, x), (y+1, x+1), (y+1, x+2), (y+1, x+3), (y+2, x), (y+2, x+1), (y+2, x+2), and (y+2, x+3)" for four pixels in the line direction following the first block BLK1 and two lines including a line different from the line in the first block BLK1 included in the second block BLK2.

As described above, when the input image data is converted into data in block units and stored in the memory unit, pixel data of the pixel region ARm of the peripheral pixels to be used for generating pixel data of the interpolation position MP can be acquired by reading the data of the three blocks BLK1, BLK2, and BLK3.

Note that, in a conventional method of sequentially converting an input image into data of a predetermined block size (for example, "2 lines×4 pixels") (hereinafter referred to as an "interpolation point four-angle extraction method"), as illustrated in FIG. 2C, a block BLKa includes pixel data "(y−1, x−4), (y−1, x−3), (y−1, x−2), (y−1, x−1), (y, x−4), (y, x−3), (y, x−2), and (y, x−1)". Furthermore, a block BLKb includes pixel data "(y−1, x), (y−1, x+1), (y−1, x+2), (y−1, x+3), (y, x), (y, x+1), (y, x+2), and (y, x+3)". Moreover, a block BLKc includes pixel data "(y+1, x−4), (y+1, x−3), (y+1, x−2), (y+1, x−1), (y+2, x−4), (y+2, x−3), (y+2, x−2), and (y+2, x−1)", and a block BLKd includes pixels "(y+1, x), (y+1, x+1), (y+1, x+2), (y+1, x+3), (y+2, x), (y+2, x+1), (y+2, x+2), and (y+2, x+3)". Therefore, by reading the data of the four blocks BLKa, BLKb, BLKc, and BLKd, the pixel data of the pixel region ARm of the peripheral pixels to be used for generating pixel data of the interpolation position MP can be acquired.

The memory control unit 12 divides the input image data stored in the memory buffer unit 11 into a first block, a second block, and a third block as illustrated in FIG. 2A or 2B, and stores the first block, the second block, and the third block in the memory unit 13.

Furthermore, the memory control unit 12 reads data of three blocks from the memory unit 13 with reference to the interpolation position calculated by the arithmetic processing unit 15, and generates pixel data of the interpolation position by interpolation processing using the read data.

Furthermore, the memory control unit 12 uses burst transfer when writing and reading image data to and from the memory unit 13 in block units.

Moreover, the memory control unit 12 causes data of each block to be stored in three banks of the memory unit 13 and reads pixel data of different blocks from the three banks, thereby enabling high-speed data reading.

Note that if the data width of the input image data is 32 bits and the data width of the data writing or data reading of the memory unit 13 is 256 bits, eight pieces of pixel data can be stored at one address of the memory unit 13. That is, when the data amount of one block is equal to the data width of the memory unit 13, one address of the memory unit 13 corresponds to one address of the block, and writing and reading of data in block units can be easily performed.

Figure 3:
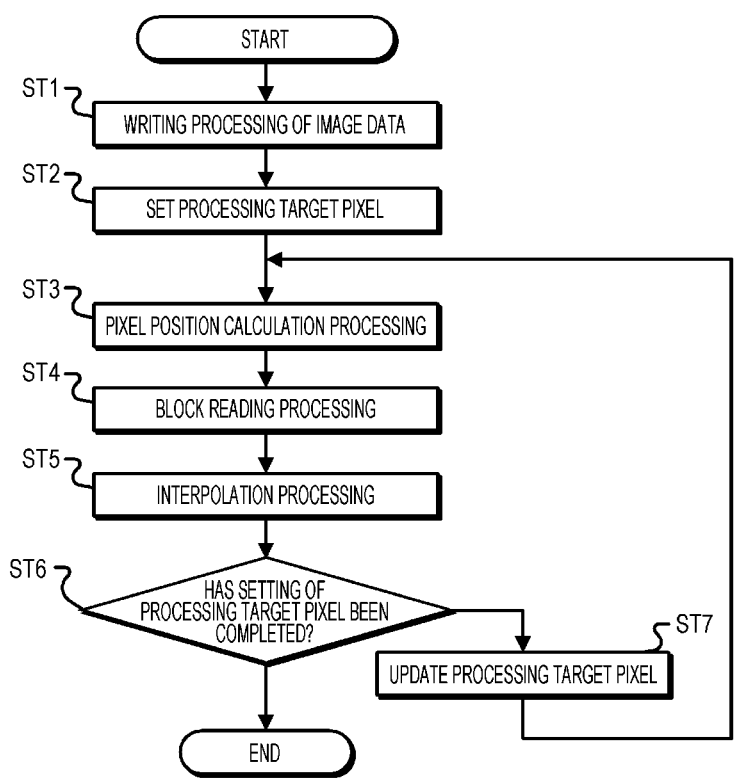
FIG. 3 is a flowchart illustrating an operation of the image processing device.

FIG. 3 is a flowchart illustrating an operation of the image processing device according to the present technology, in which in step ST1, the image processing device performs image data writing processing. The memory control unit 12 of the image processing device 10 causes the memory unit 13 to store the input image data divided into a first block having pixel data of a predetermined number of pixels in a line direction for a plurality of lines, a second block having pixel data of a predetermined number of pixels following the first block in the line direction, for a plurality of lines including a part of the lines of the first block, and a third block having pixel data of a predetermined number of pixels following the first block in the line direction, for a plurality of lines including a line different from the line included in the second block in the first block, and proceeds to step ST2.

In step ST2, the image processing device sets a processing target pixel. The arithmetic processing unit 15 of the image processing device 10 sets a pixel after image conversion for generating pixel data as a processing target pixel, and proceeds to step ST3.

In step ST3, the image processing device performs interpolation position calculation processing. The arithmetic processing unit 15 of the image processing device 10 calculates a pixel position before image conversion corresponding to the processing target pixel set in step ST2 as an interpolation position, and proceeds to step ST4.

In step ST4, the image processing device performs block reading processing. The memory control unit 12 of the image processing device 10 reads, from the memory unit 13, data of a block including pixel data of the peripheral pixels to be used for generating pixel data of the interpolation position calculated in step ST3, and proceeds to step ST5.

In step ST5, the image processing device performs interpolation processing. The interpolation processing unit 14 of the image processing device 10 generates the pixel data of the processing target pixel from the data of the block read in step ST4 by performing interpolation processing using the pixel data of the peripheral pixels to be used for generating the pixel data of the interpolation position, and proceeds to step ST6.

In step ST6, the image processing device determines whether the setting of the processing target pixel has been completed. In a case where there is an image that has not been set as the processing target pixel in the image after image conversion, the arithmetic processing unit 15 of the image processing device 10 proceeds to step ST7, and in a case where each pixel after image conversion has been set as the processing target pixel and pixel data has been generated, the arithmetic processing unit 15 ends the processing.

In step ST7, the image processing device updates the processing target pixel. The arithmetic processing unit 15 of the image processing device 10 sets a pixel that is not set as a processing target pixel as a new processing target pixel, and returns to step ST3.

Figure 4:
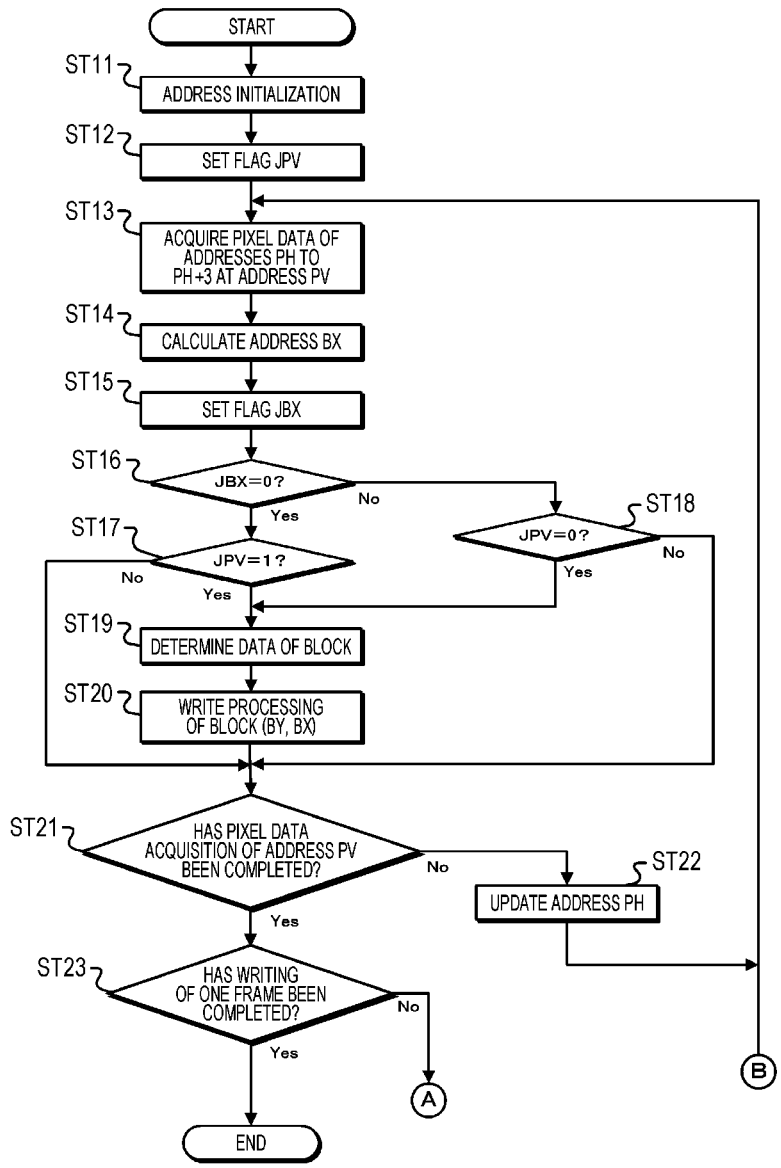
FIG. 4 is a flowchart illustrating image data writing processing.
Figure 5:
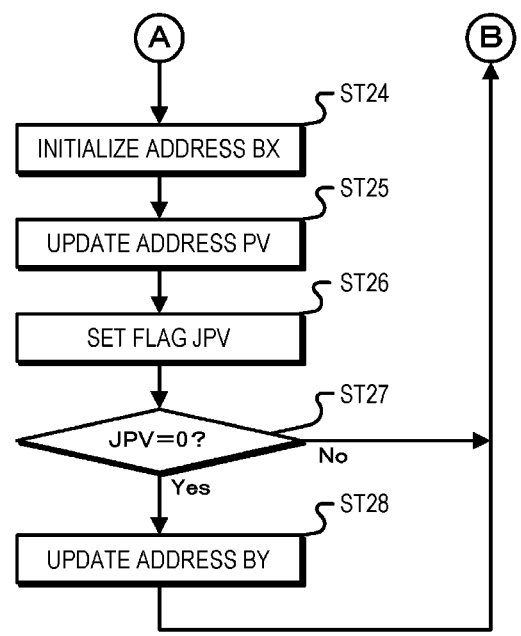
FIG. 5 is a flowchart illustrating the image data writing processing.

<2-1. Image data writing processing> Next, processing of writing image data into the memory unit 13 will be described. FIGS. 4 and 5 are flowcharts illustrating image data writing processing. Furthermore, FIGS. 6A, 6B, 6C, 6D, and 6E illustrate specific examples of input image data and blocks. Note that the block size is "2 lines×4 pixels".

In step ST11 of FIG. 4, the memory control unit performs address initialization. The memory control unit 12 initializes an address (PV, PH) indicating a pixel position of the input image and an address (BY, BX) of the block to set "PV=0, PH=0, BY=0, and BX=0", and proceeds to step ST12.

In step ST12, the memory control unit sets a flag JPV. The memory control unit 12 sets the flag JPV indicating whether the address PV is an odd number or an even number. Specifically, an operation of "JPV=(PV %2)" is performed, and the process proceeds to step ST13 with JPV=1 in a case of an odd number and JPV=0 in a case of an even number. Note that "%" is a remainder operator.

In step ST13, the memory control unit acquires pixel data of the addresses PH to PH+3 at the address PV. The memory control unit 12 acquires pixel data of four pixels at addresses (PV, PH), (PV, PH+1), . . . , and (PV, PH+3) from the memory buffer unit 11, and proceeds to step ST14.

In step ST14, the memory control unit calculates the address BX. The memory control unit 12 calculates the address BX on the basis of the address PH and the number of pixels in a horizontal direction of the block. Specifically, an operation of "BX=INT(PH/4)" is performed, an integer part of a result of dividing the address PH by the number of pixels 4 in the horizontal direction of the block is set as the address BX, and the process proceeds to step ST15. Note that "INT" represents an integer part of the division result.

In step ST15, the memory control unit sets a flag JBX. The memory control unit 12 sets the flag JBX indicating whether the address BX is an odd number or an even number. Specifically, an operation of "JBX=(BX %2)" is performed, JBX=1 is set in a case where the address BX is an odd number and JBX=0 is set in a case where the address BX is an even number, and the process proceeds to step ST16.

In step ST16, the memory control unit determines whether the flag JBX is 0. The memory control unit 12 proceeds to step ST17 in a case where the address BX is an even number and the flag JBX is 0, and proceeds to step ST18 in a case where the address BX is an odd number and the flag JBX is 1.

In step ST17, the memory control unit determines whether the flag JPV is 1. The memory control unit 12 proceeds to step ST19 in a case where the address PV is an odd number and the flag JPV is 1, and proceeds to step ST21 in a case where the address PV is an even number and the flag JPV is 0.

When the process proceeds from step ST16 to step ST18, the memory control unit 12 determines whether the flag JPV is 0. The memory control unit proceeds to step ST19 in a case where the address PV is an even number and the flag JPV is 0, and proceeds to step ST21 in a case where the address PV is an odd number and the flag JPV is 1.

In step ST19, the memory control unit 12 determines data of a block. The memory control unit 12 proceeds to step ST20 using the "(PV, PH), (PV, PH+1), . . . , (PV, PH+3)" and already acquired "(PV−1, PH), (PV−1, PH+1), . . . , (PV−1, PH+3)" as the image data of a block (BY, BX).

In step ST20, the memory control unit performs writing processing of the block (BY, BX). The memory control unit 12 records the image data of the block (BY, BX) in three banks of the memory unit 13 by burst transfer, and proceeds to step ST21.

In step ST21, the memory control unit determines whether all the pixel data at the address PV have been acquired. The memory control unit proceeds to step ST22 in a case where acquisition of the pixel data at the address PV is not completed, and proceeds to step ST23 in a case where the acquisition is all completed.

In step ST22, the memory control unit updates the address PH. The memory control unit 12 performs processing of "PH=PH+4", updates the address PH indicating the first pixel position in the horizontal direction in the block, and returns to step ST13.

In step ST23, the memory control unit determines whether writing of one frame has been completed. The memory control unit proceeds to step ST24 in FIG. 5 in a case where the address PV does not indicate the last position (last line) in the vertical direction, and ends the writing processing of the image of one frame in a case where the address PV indicates the last position (last line) in the vertical direction.

In step ST24, the memory control unit initializes the address BX. Since reading of the pixel data at the address PV has been completed, the memory control unit 12 sets the address BX to "BX=0" and proceeds to step ST25.

In step ST25, the memory control unit updates the address PV. The memory control unit 12 performs processing of "PV=PV+1", updates the address PV, and proceeds to step ST26.

In step ST26, the memory control unit sets the flag JPV. The memory control unit 12 sets the flag JPV indicating whether the address PV is an odd number or an even number. Specifically, the operation of "JPV=(PV %2)" is performed, JPV=1 is set in a case of an odd number and JPV=0 in a case of an even number, and the process proceeds to step ST27.

In step ST27, the memory control unit determines whether the flag JPV is 0. The memory control unit 12 proceeds to step ST28 in a case where the address PV is an even number and the flag JPV is 0, and returns to step ST13 of FIG. 4 in a case where the address PV is an odd number and the flag JPV is 1.

In step ST28, the memory control unit updates the address BY. The memory control unit 12 performs processing of "BY=BY+1", updates the address BY, and returns to step ST13 in FIG. 4.

Figures 6A, 6B, 6C, 6D, 6E:
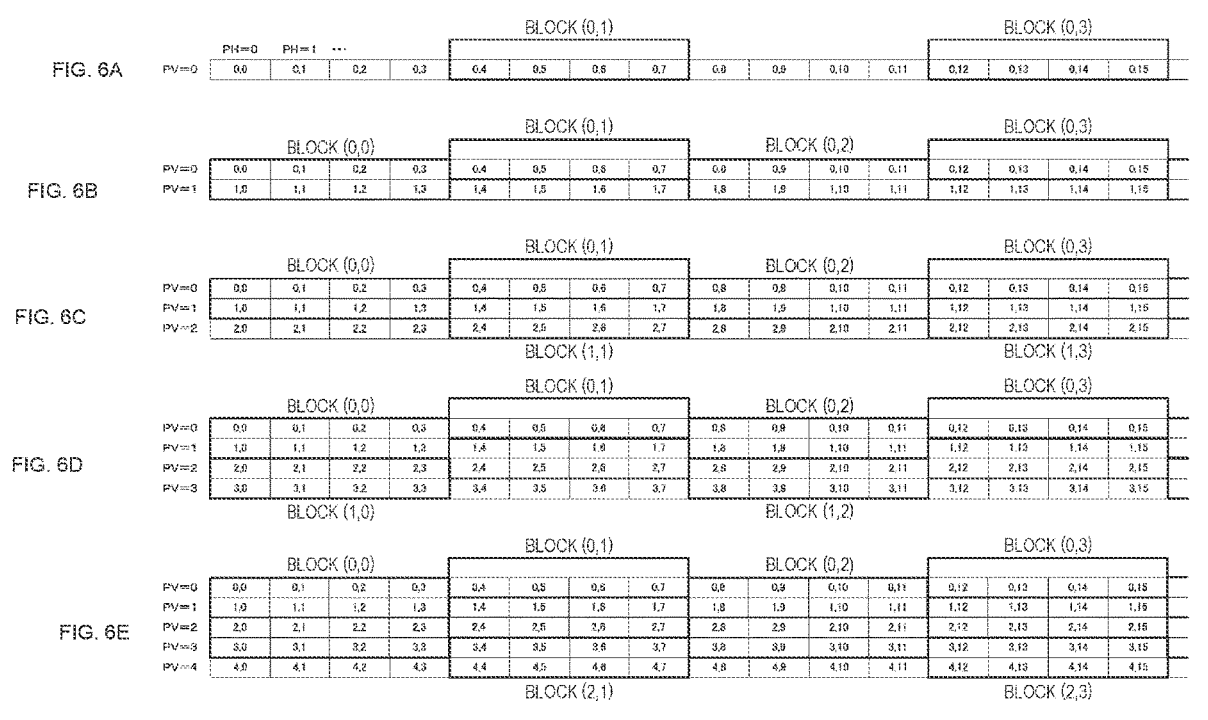

When such processing is performed, as illustrated in FIG. 6A, for the address PV=0, pixel data of addresses (0, 4), (0, 5), (0, 6), and (0, 7) is stored in the memory unit 13 as data of a block (0, 1). Furthermore, pixel data of addresses (0, 12), (0, 13), (0, 14), and (0, 15) is stored in the memory unit 13 as data of a block (0, 3). Similarly, pixel data of four pixels for every four pixels at the address PV=0 is stored in the memory unit 13 as data of a block at an address BY=0 and BX=odd number.

Further, as illustrated in FIG. 6B, for the address PV=1, pixel data of addresses (1, 0), (1, 1), (1, 2), and (1, 3) is stored in the memory unit 13 as data of a block (0, 0) together with pixel data of addresses (0, 0), (0, 1), (0, 2), and (0, 3). Furthermore, pixel data of addresses (1, 8), (1, 9), (1, 10), and (1, 11) is stored in the memory unit 13 as data of a block (0, 2) together with pixel data of the addresses (0, 8), (0, 9), (0, 10), and (0, 11). Similarly, pixel data of four pixels for every four pixels at the address PV=1 is stored in the memory unit 13 as data of a block at an address BY=0 and BX=even number together with pixel data of four pixels for every four pixels at the address PV=0.

Further, as illustrated in FIG. 6C, for the address PV=2, pixel data of addresses (2, 4), (2, 5), (2, 6), and (2, 7) is stored in the memory unit 13 as data of a block (1, 1) together with pixel data of addresses (1, 4), (1, 5), (1, 6), and (1, 7). Furthermore, pixel data of addresses (2, 8), (2, 9), (2, 10), and (2, 11) is stored in the memory unit 13 as data of a block (1, 3) together with pixel data of the addresses (1, 8), (1, 9), (1, 10), and (1, 11). Similarly, pixel data of four pixels for every four pixels at the address PV=2 is stored in the memory unit 13 as data of a block at an address BY=1 and BX=odd number together with pixel data of four pixels for every four pixels at the address PV=1.

Moreover, as illustrated in FIGS. 6D and 6E, the address PV=3 and the address PV=4 are similarly stored in the memory unit 13 as block data. Hereinafter, processing is similarly performed, and image data of one frame can be recorded in the memory unit in block units.

As described above, when the input image data is converted into data in block units, the pixel data of the peripheral pixels used for generating the pixel data of the interpolation position can be acquired by reading the pixel data of the three blocks.

Furthermore, data of the block is stored in the bank of the memory unit 13 by burst transfer, so that the writing processing of the input image data can be performed at high speed. Furthermore, by storing data of the block in three banks, it is possible to efficiently read a block including pixel data used for interpolation processing of pixel data as described later.

<2-2. Image Data Reading Processing>

Next, processing of reading image data from the memory unit 13 will be described. In the processing of reading image data, data of a block including pixel data of peripheral pixels necessary for generating pixel data of an interpolation position calculated in the interpolation position calculation processing is read from the memory unit 13.

Figure 7:
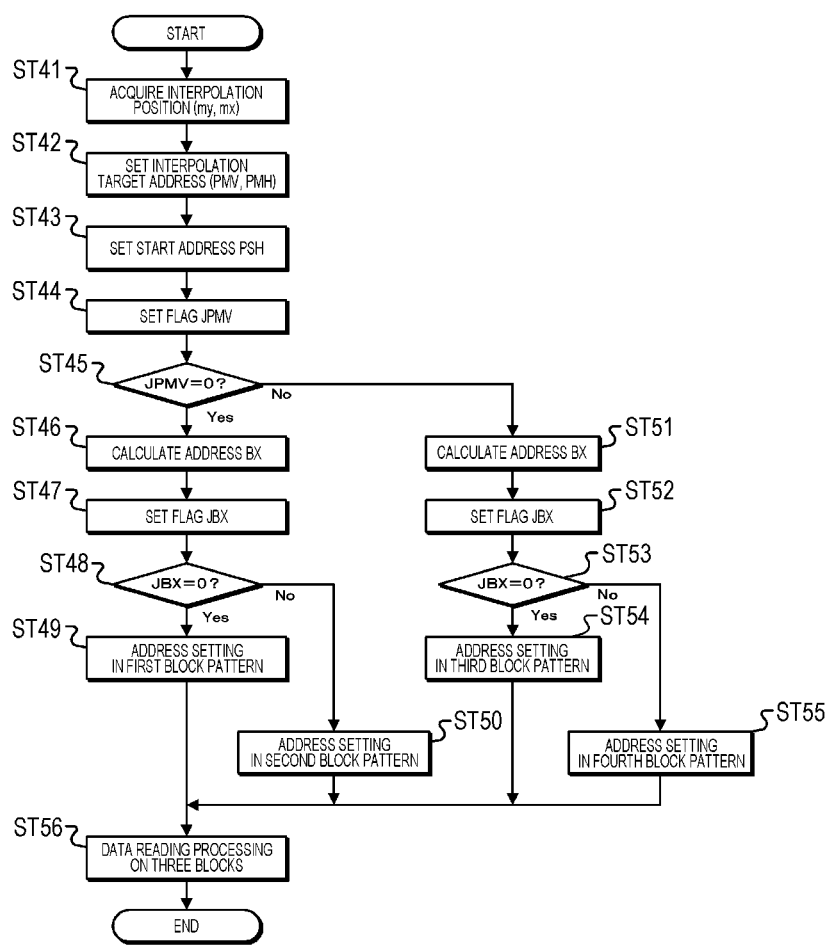
FIG. 7 is a flowchart illustrating image data reading processing.

FIG. 7 is a flowchart illustrating image data reading processing. Note that the block size is "2 lines×4 pixels", and the size of the pixel region ARm of the peripheral pixels is also "2 lines×4 pixels".

In step ST41, the memory control unit acquires an interpolation position (my, mx). The memory control unit 12 acquires the interpolation position (my, mx) calculated by the arithmetic processing unit 15 and proceeds to step ST42.

In step ST42, the memory control unit sets an interpolation target address (PMV, PMH). The memory control unit 12 performs operations of "PMV=INT(my)" and "PMH=INT(mx)", sets an interpolation target address (PMV, PMH) corresponding to the interpolation position acquired in step ST41, and proceeds to step ST43.

In step ST43, the memory control unit sets a start address PSH of a peripheral pixel necessary for interpolation processing. For example, in a case where the interpolation processing is performed using pixel data of four pixels in the horizontal direction with reference to the interpolation position mx, the memory control unit 12 performs an operation of "PSH=PMH−(4 pixels/2)", sets the start address PSH of the peripheral pixel, and proceeds to step ST44. Note that in a case where an address PMH is smaller than "2", setting "PSH=0" can prevent the start address PSH from becoming equal to or smaller than the initial value. Furthermore, in a case where the maximum address of the input image data in the horizontal direction is "PHmax", pixel data of "2 lines×4 pixels" can be obtained as peripheral pixels even if the address PMH=PHmax. Therefore, special processing for the horizontal direction maximum address is unnecessary.

In step ST44, the memory control unit sets a flag JPMV. The memory control unit 12 sets the flag JPMV indicating whether the address PMV is an odd number or an even number.

Specifically, the memory control unit 12 performs an operation of "JPMV=(PMV %2)", sets JPMV=1 in a case where the number is an odd number, and sets JPMV=0 in a case where the number is an even number, and proceeds to step ST45.

In step ST45, the memory control unit determines whether the flag JPMV is 0. The memory control unit 12 proceeds to step ST46 in a case where the flag JPMV is 0 and the address PMV is an even number, and proceeds to step ST51 in a case where the flag JBX is not 0 and the address PMV is an odd number.

In step ST46, the memory control unit calculates an address BX of the block. The memory control unit 12 performs an operation of "BX=INT(PSH/4)", calculates an address BX of a block including the pixel data of the start address PSH, and proceeds to step ST47.

In step ST47, the memory control unit sets the flag JBX. The memory control unit 12 sets the flag JBX indicating whether the address BX is an odd number or an even number. Specifically, the memory control unit 12 performs the operation of "JBX=(BX %2)", sets JBX=1 in a case where the address BX is an odd number and sets JBX=0 in a case where the address BX is an even number, and proceeds to step ST48.

In step ST48, the memory control unit determines whether the flag JBX is 0. The memory control unit proceeds to step ST49 in a case where the flag JBX is 0 and the address BX is an even number, and proceeds to step ST50 in a case where the flag JBX is not 0 and the address PMV is an odd number.

In step ST49, the memory control unit performs address setting in a first block pattern. The memory control unit 12 sets a pattern of the three blocks to be read as the first block pattern, and sets the addresses (BY1, BX1), (BY2, BX2), and (BY3, BX3) of the three blocks. Note that FIGS. 8A, 8B, 8C, and 8D illustrate addresses of three blocks. The memory control unit 12 performs operations of Equations (1) to (6), sets the addresses (BY1, BX1), (BY2, BX2), and (BY3, BX3) of the three blocks illustrated in FIG. 8A, and proceeds to step ST56.

$$BX1 = INT(PSH/4) \quad (1)$$

$$BY1 = INT(PMV/2) \quad (2)$$

$$BX2 = (INT(PSH/4))+1 \quad (3)$$

$$BY2 = INT(PMV/2) \quad (4)$$

$$BX3 = (INT(PSH/4))+1 \quad (5)$$

$$BY3 = (INT(PMV/2))+1 \quad (6)$$

In step ST50, the memory control unit performs address setting in a second block pattern. The memory control unit 12 sets a pattern of the three blocks to be read as the second block pattern, and sets the addresses (BY1, BX1), (BY2, BX2), and (BY3, BX3) of the three blocks. The memory control unit 12 performs operations of Equations (7) to (12), sets the addresses (BY1, BX1), (BY2, BX2), and (BY3, BX3) of the three blocks illustrated in FIG. 8B, and proceeds to step ST56.

$$BX1 = (INT(PSH/4))+1 \quad (7)$$

$$BY1 = INT(PMV/2) \quad (8)$$

$$BX2 = INT(PSH/4) \quad (9)$$

$$BY2 = INT(PMV/2) \quad (10)$$

$$BX3 = INT(PSH/4) \quad (11)$$

$$BY3 = (INT(PMV/2))+1 \quad (12)$$

When the process proceeds from step ST45 to step ST51, the memory control unit calculates the block address BX. The memory control unit 12 performs the operation of "BX=INT(PSH/4)", calculates an address BX of a block including the pixel data of the start address PSH, and proceeds to step ST52.

In step ST52, the memory control unit sets the flag JBX. The memory control unit 12 sets the flag JBX indicating whether the address BX is an odd number or an even number. Specifically, the memory control unit 12 performs the operation of "JBX=(BX %2)", sets JBX=1 in a case where the address BX is an odd number and sets JBX=0 in a case where the address BX is an even number, and proceeds to step ST53.

In step ST53, the memory control unit determines whether the flag JBX is 0. The memory control unit proceeds to step ST54 in a case where the flag JBX is 0 and the address BX is an even number, and proceeds to step ST55 in a case where the flag JBX is not 0 and the address PMV is an odd number.

In step ST54, the memory control unit performs address setting in a third block pattern. The memory control unit 12 sets a pattern of the three blocks to be read as the third block pattern, and sets the addresses (BY1, BX1), (BY2, BX2), and (BY3, BX3) of the three blocks. The memory control unit 12 performs operations of Equations (13) to (18), sets the addresses (BY1, BX1), (BY2, BX2), and (BY3, BX3) of the three blocks illustrated in FIG. 8C, and proceeds to step ST56.

$$BX1 = (INT(PSH/4))+1 \quad (13)$$

$$BY1 = (INT(PMV/2))+1 \quad (14)$$

$$BX2=\text{INT}(PSH/4) \quad (15)$$

$$BY2=\text{INT}(PMV/2) \quad (16)$$

$$BX3=\text{INT}(PSH/4) \quad (17)$$

$$BY3=(\text{INT}(PMV/2))+1 \quad (18)$$

In step ST55, the memory control unit performs address setting in a fourth block pattern. The memory control unit 12 sets a pattern of the three blocks to be read as the fourth block pattern, and sets the addresses (BY1, BX1), (BY2, BX2), and (BY3, BX3) of the three blocks. The memory control unit 12 performs operations of Equations (19) to (24), sets the addresses (BY1, BX1), (BY2, BX2), and (BY3, BX3) of the three blocks illustrated in FIG. 8D, and proceeds to step ST56.

$$BX1=\text{INT}(PSH/4) \quad (19)$$

$$BY1=(\text{INT}(PMV/2))+1 \quad (20)$$

$$BX2=(\text{INT}(PSH/4))+1 \quad (21)$$

$$BY2=\text{INT}(PMV/2) \quad (22)$$

$$BX3=(\text{INT}(PSH/4))+1 \quad (23)$$

$$BY3=(\text{INT}(PMV/2))+1 \quad (24)$$

In step ST56, the memory control unit performs data reading processing on three blocks. The memory control unit 12 reads, for example, pixel data of the first block having the address (BY1, BX1) from a first bank of the memory unit 13. Furthermore, the memory control unit 12 reads pixel data of the second block having the address (BY2, BX2) from the second bank of the memory unit 13, and reads pixel data of the third block having the address (BY3, BX3) from the third bank.

Figures 9A, 9B:
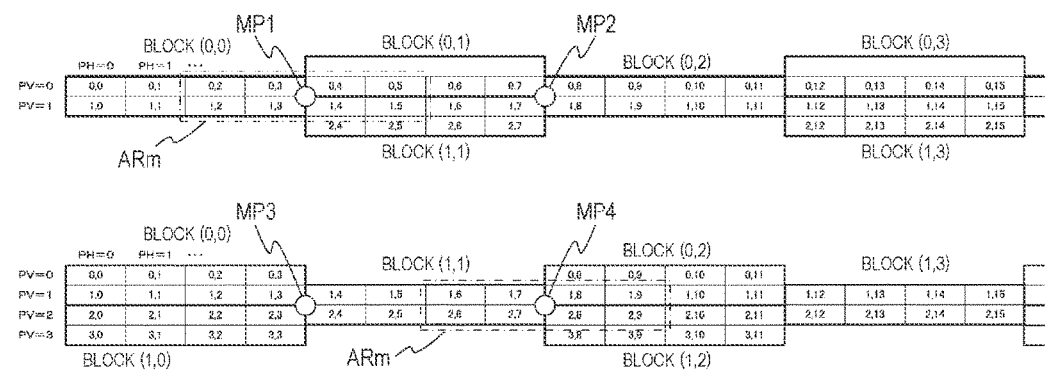

By performing the reading processing of image data in this manner, it is possible to read data of the block including pixel data of peripheral pixels necessary for generating pixel data of the interpolation position calculated in the interpolation position calculation processing. FIGS. 9A and 9B illustrate a relationship between an interpolation position at which pixel data is generated and a block from which data is read. Note that in FIGS. 9A and 9B, the blocks are displayed with line positions aligned.

For example, as illustrated in FIG. 9A, in a case where pixel data of the interpolation position MP1 is generated, data of a block (0, 0), (0, 1), and (1, 1) is read in the first block pattern, and in a case where pixel data of the interpolation position MP2 is generated, data of a block (0, 1), (1, 1), and (0, 2) is read in the second block pattern. Furthermore, as illustrated in FIG. 9B, in a case where pixel data of the interpolation position MP3 is generated, data of a block (0, 0), (1, 0), and (1, 1) is read in the third block pattern, and in a case where pixel data of the interpolation position MP4 is generated, data of a block (1, 1), (0, 2), and (1, 2) is read in the fourth block pattern.

Furthermore, the memory control unit 12 selects pixel data to be used for interpolation processing of pixel data from data read from the memory unit 13 and outputs the pixel data to the interpolation processing unit 14. For example, in a case of generating the pixel data of the interpolation position MP1, pixel data at the addresses (0, 2), (0, 3), (0, 4), (0, 5), (1, 2), (1, 3), (1, 4), and (1, 5) in the pixel region ARm of peripheral pixels is selected from pixel data of the read block (0, 0), (0, 1), and (1, 1), and is output to the interpolation processing unit 14. Furthermore, for example, in a case of generating the pixel data of the interpolation position MP4, pixel data at the addresses (1, 6), (1, 7), (1, 8), (1, 9), (2, 6), (2, 7), (2, 8), and (2, 9) in the pixel region ARm of peripheral pixel is selected from pixel data of the read block (1, 1), (0, 2), and (1, 2), and is output to the interpolation processing unit 14.

As described above, by reading pixel data of three blocks with the block pattern corresponding to the pixel position at which the pixel data is generated, selecting pixel data to be used for the interpolation processing from the read pixel data, and outputting the selected pixel data to the interpolation processing unit 14, the image processing can be performed more efficiently as compared with the conventional interpolation point four-angle extraction method.

Furthermore, in a case where the DRAM is used as the memory unit 13, since there is a long delay time in a case where a ROW address is updated and data is read, in a case where data of three blocks is stored in one bank, and the ROW address is sequentially updated and data of three blocks is read, it takes time to read the data from the memory unit 13. However, by reading data of different blocks from the three banks as in the present technology, it is possible to read data from the memory unit 13 at high speed.

Here, memory access band efficiency of writing and reading can be calculated on the basis of the following equation. Note that a memory clock frequency is "Fmem", a memory data width is "Dmem", a memory write efficiency coefficient is "C(mem(w))", a memory read efficiency coefficient is "C(mem(r))", a clock frequency of the image data is "Fvid", a data width of the image data is "Dvid", a write efficiency coefficient of the image data is "C(vid(w))", and a read efficiency coefficient of the image data is "C(vid(r))".

In this case, according to the present technology, the write band write band efficiency "Etri(w)" is calculated on the basis of Equation (25), and the read band efficiency "Etri(r)" is calculated on the basis of Equation (26).

Furthermore, the write band efficiency [1/%]: Esqr(w) of the conventional interpolation point four-angle extraction method is calculated on the basis of Equation (27), and the read band efficiency [1/%]: Esqr(r) is calculated on the basis of Equation (28).

[Equation 1]

$$E_{tri(w)} = \frac{F_{vid} * D_{vid} * C_{vid(w)}}{F_{mem} * D_{mem} * C_{mem(w)}} \quad (25)$$

$$E_{tri(r)} = \frac{F_{vid} * D_{vid} * C_{vid(r)}}{F_{mem} * D_{mem} * C_{mem(r)}} * 3 \quad (26)$$

$$E_{sqr(w)} = \frac{F_{vid} * D_{vid} * C_{vid(w)}}{F_{mem} * D_{mem} * C_{mem(w)}} \quad (27)$$

$$E_{sqr(r)} = \frac{F_{vid} * D_{vid} * C_{vid(r)}}{F_{mem} * D_{mem} * C_{mem(r)}} * 4 \quad (28)$$

As described above, as is clear from Equations (26) and (28), according to the present technology, since the readout band efficiency is better than that of the interpolation point four-angle extraction method, image processing can be efficiently performed.

3. MODIFICATION EXAMPLE

In the above-described embodiment, although the case where data of three blocks is read from the memory unit 13 has been described, in a case where the size of one block in the line direction is equal to or larger than the size of a pixel region of peripheral pixels used for the interpolation processing in the line direction, and the block includes the pixel region of peripheral pixels inside, the data of one block or two blocks is read. That is, in a case where the interpolation position is a position including pixel data of peripheral pixels only in any one of the first, second, and third blocks, the pixel data of the block including the pixel data of peripheral pixels is read from the memory unit. Furthermore, in a case where the interpolation position is a position including the pixel data of peripheral pixels in two blocks of the first, second, and third blocks, the pixel data of the two blocks including the pixel data of peripheral pixels is read from the memory unit. By reading the pixel data in this manner, interpolation processing can be performed.

Figures 10A, 10B:
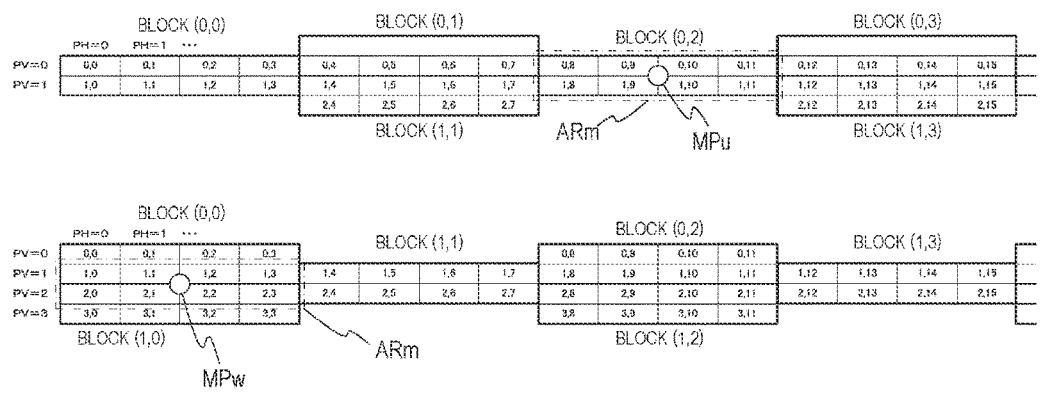

FIGS. 10A and 10B illustrate a case where the interpolation processing can be performed by reading data of one block or two blocks. For example, at the interpolation position MPu illustrated in FIG. 10A, pixel data of addresses (0, 8), (0, 9), (0, 10), (0, 11), (1, 8), (1, 9), (1, 10), and (1, 11) used for the interpolation processing is stored as data of one block (0, 2). Furthermore, at the interpolation position MPW illustrated FIG. 10B, pixel data of addresses (1, 0), (1, 1), (1, 2), (1, 3), (2, 0), (2, 1), (2, 2), and (2, 3) used for the interpolation processing is stored in two blocks (0, 0), (1, 0). Therefore, it is determined whether the interpolation position is a position where the interpolation processing can be performed with the pixel data of one block or two blocks, and if the block to be read on the basis of a determination result is set to one block or two blocks, it is possible to further efficiently read the data from the memory unit 13.

Note that the flowcharts of FIGS. 4 and 5 illustrate an operation in a case where the image data is stored in the memory unit 13 as illustrated in FIGS. 6A, 6B, 6C, 6D and 6E, and the processing may be changed according to the number of pixels or the block size of peripheral pixels used in the interpolation processing. Furthermore, the flowchart of FIG. 7 illustrates an operation in a case of reading the image data stored as illustrated in FIGS. 8A, 8B, 8C, and 8D, and the processing may be changed according to the block size of the image data stored in the memory unit 13, the number of pixels of peripheral pixels used in the interpolation processing, and the like.

Furthermore, in the above-described embodiment, a case where the memory unit 13 is configured using the DRAM is exemplified, but the memory used in the memory unit 13 is not limited to the DRAM, and for example, an SRAM may be used.

Furthermore, since the memory access band can be reduced, the pixel data of the interpolation points to be read can be increased, so that the number of interpolation points in the image deformation processing can be increased to improve the image quality. In addition, since the memory access band can be reduced, the number of memories to be used can be reduced, and a memory with low performance can be used, so that the cost can be reduced. Furthermore, with respect to a device such as a CPU or a GPU or FPGA, or an ASIC on which the algorithm of the present technology is implemented, the number and performance of the devices can be reduced depending on the number and performance of the connected memories, so that the cost can be reduced.

Moreover, since the memory access band can be reduced, the number of memories to be used can be reduced, and the frequency of the memory can be reduced, so that power consumption can be reduced.

Note that as an example of speeding up image processing and performing the image processing by hardware, processing of changing an image used for broadcast program production to an arbitrary shape, digital multi effects (DME) used when moving the image, and the like can be exemplified.

Furthermore, a series of processes described in the description can be executed by hardware, software, or a combined configuration of the both. In a case of executing processing by software, a program in which a processing sequence is recorded is installed in a memory in a computer incorporated in dedicated hardware and executed. Alternatively, the program can be installed and executed in a general-purpose computer capable of executing various types of processing.

For example, the program can be recorded in advance in a hard disk, a solid state drive (SSD), or a read only memory (ROM) as a recording medium. Alternatively, the program can be temporarily or permanently stored (recorded) in a removable recording medium such as a flexible disk, a compact disc read only memory (CD-ROM), a magneto optical (MO) disk, a digital versatile disc (DVD), a Blu-ray disc (BD) (registered trademark), a magnetic disk, or a semiconductor memory card. Such a removable recording medium can be provided as what is called package software.

Furthermore, in addition to installing the program from the removable recording medium to the computer, the program may be transferred from a download site to the computer wirelessly or by wire via a network such as a local area network (LAN) or the Internet. In the computer, the program thus transferred can be received and installed in a recording medium such as a built-in hard disk.

Note that the effects described in the present description are merely examples and are not limited, and additional effects that are not described may be provided. Furthermore, the present technology should not be construed as being limited to the embodiments of the technology described above. Embodiments of this technology disclose the present technology in the form of exemplification, and it is obvious that those skilled in the art can make modifications and substitutions of the embodiments without departing from the gist of the present technology. That is, in order to determine the gist of the present technology, the claims should be taken into consideration.

Furthermore, the image processing device of the present technology can also have configurations as follows.

(1) An image processing device including:
a memory unit that stores input image data divided into a first block having pixel data of a predetermined number of pixels in a line direction for a plurality of lines, a second block having pixel data of a predetermined number of pixels following the first block in the line direction for a plurality of lines including a part of the lines of the first block, and a third block having pixel data of a predetermined number of pixels following the first block in the line direction for a plurality of lines including a line different from the line included in the second block in the first block; and
a memory control unit that reads the pixel data of the first, second, and third blocks including pixel data of a peripheral pixel to be used in generating pixel data of an interpolation position from the memory unit.

(2) The image processing device according to (1), in which
the memory unit stores the input image data divided into the blocks in three areas, and
the memory control unit reads the pixel data of the first, second, and third blocks from a different area in block units.

(3) The image processing device according to (1) or (2), in which the memory control unit uses burst transfer to read the pixel data from the first, second, and third blocks.

(4) The image processing device according to any one of (1) to (3), in which
the memory control unit includes
a read address generation unit that generates a read address to read the pixel data of the peripheral pixel to be used in generating pixel data of the interpolation position, and
a read address conversion processing unit that converts the read address generated by the read address generation unit into an address in block units, and
the memory control unit reads the pixel data of the first, second, and third blocks including the pixel data of the peripheral pixel from the memory unit using the address obtained by the read address conversion processing unit.

(5) The image processing device according to any one of (1) to (4), in which
the memory control unit includes
a read image data processing unit that selects pixel data of the peripheral pixel from the pixel data of the first, second, and third blocks read from the memory unit and outputs the pixel data to an interpolation processing unit.

(6) The image processing device according to any one of (1) to (5), in which
the memory control unit includes
a write image data processing unit that divides the input image data into data of the first block, data of the second block, and data of the third block, and
a write address generation unit that generates a write address to write the input image data processed as block units by the write image data processing unit in the memory unit in block units.

(7) The image processing device according to any one of (1) to (6), in which the memory control unit reads, from the memory unit, pixel data of a block including pixel data of a peripheral pixel in a case where the interpolation position is a position including the pixel data of the peripheral pixel only in one of the first, second, and third blocks, and reads, from the memory unit, pixel data of two blocks including the pixel data of the peripheral pixel in a case where the interpolation position is a position including the pixel data of the peripheral pixel in two blocks of the first, second, and third blocks.

(8) The image processing device according to any one of (1) to (7), further including:
an arithmetic processing unit that calculates the interpolation position that is a pixel position before image conversion corresponding to a pixel position after image conversion; and
an interpolation processing unit that performs interpolation processing using pixel data of a peripheral pixel read from the memory unit by the memory control unit and generates pixel data of the interpolation position calculated by the arithmetic processing unit.

(9) The image processing device according to (8), in which the predetermined number of pixels in the line direction is equal to or more than the number of pixels in the line direction of peripheral pixels used in the interpolation processing, and the first block includes all lines of peripheral pixels used in the interpolation processing.

(10) The image processing device according to any one of (1) to (9), in which data amounts of the first, second, and third blocks are equal to a data width of the memory unit.

REFERENCE SIGNS LIST

10 Image processing device
11 Memory buffer unit
12 Memory control unit
13 Memory unit
14 Interpolation processing unit
15 Arithmetic processing unit
121 Write image data processing unit
122 Write address generation unit
123 Read address generation unit
124 Read address conversion processing unit
125 Read image data processing unit
126 Access control unit

The invention claimed is:

1. An image processing device, comprising:
a memory circuit configured to store input image data divided into a first block having pixel data of a predetermined number of pixels in a line direction for a first plurality of lines, a second block having pixel data of a predetermined number of pixels following the first block in the line direction for a second plurality of lines including a part of the first plurality of lines of the first block, and a third block having pixel data of a predetermined number of pixels following the first block in the line direction for a third plurality of lines including a line different from a line included in the second block in the first block; and
circuitry configured to read the pixel data of the first block, the pixel data of the second block, and the pixel data of the third block including pixel data of a peripheral pixel to be used in generating pixel data of an interpolation position from the memory circuit.

2. The image processing device according to claim 1, wherein
the memory circuit is further configured to store the input image data divided into blocks in three areas; and
the circuitry is further configured to read the pixel data of the first block, the pixel data of the second block, and the pixel data of the third block from a different area in block units.

3. The image processing device according to claim 1, wherein
the circuitry is further configured to use burst transfer to read the pixel data from the first block, the pixel data of the second block, and the pixel data of the third block.

4. The image processing device according to claim 1, wherein the circuitry is further configured to:
generate a read address to read the pixel data of the peripheral pixel to be used in generating the pixel data of the interpolation position, and
convert the read address into an address in block units, and
read the pixel data of the first block, the pixel data of the second block, and the pixel data of the third block including the pixel data of the peripheral pixel from the memory circuit using the address.

5. The image processing device according to claim 1, wherein the circuitry is further configured to:

select the pixel data of the peripheral pixel from the pixel data of the first block, the pixel data of the second block, and the pixel data of the third block read from the memory circuit, and output the selected pixel data.

6. The image processing device according to claim 1, wherein the circuitry is further configured to:

divide the input image data into data of the first block, data of the second block, and data of the third block, and generate a write address to write the input image data, processed as block units, in the memory circuit in block units.

7. The image processing device according to claim 1, wherein the circuitry is further configured to:

read, from the memory circuit, pixel data of a block including the pixel data of the peripheral pixel in a case where the interpolation position is a position including the pixel data of the peripheral pixel only in one of the first block, the second block, and the third block, and read, from the memory circuit, pixel data of two blocks including the pixel data of the peripheral pixel in a case where the interpolation position is a position including the pixel data of the peripheral pixel in two blocks of the first block, the second block, and the third block.

8. The image processing device according to claim 1, wherein the circuitry is further configured to:

calculate the interpolation position that is a pixel position before image conversion corresponding to a pixel position after image conversion; and perform interpolation processing using the pixel data of the peripheral pixel read from the memory circuit by the circuitry; and generate the pixel data of the calculated interpolation position.

9. The image processing device according to claim 8, wherein the predetermined number of pixels in the line direction is equal to or more than the number of pixels in the line direction of peripheral pixels to be used in the interpolation processing, and the first block includes all lines of peripheral pixels to be used in the interpolation processing.

10. The image processing device according to claim 1, wherein data amounts of the first block, the second block, and the third block are equal to a data width of the memory circuit.

11. An image processing method, comprising reading, by circuitry, from a memory circuit that stores input image data divided into a first block having pixel data of a predetermined number of pixels in a line direction for a first plurality of lines, a second block having pixel data of a predetermined number of pixels following the first block in the line direction for a second plurality of lines including a part of the first plurality of lines of the first block, and a third block having pixel data of a predetermined number of pixels following the first block in the line direction for a third plurality of lines including a line different from a line included in the second block in the first block, the pixel data of the first block, the pixel data of the second block, and the pixel data of the third block including pixel data of a peripheral pixel to be used in generating pixel data of an interpolation position.

12. A non-transitory computer-readable medium having stored thereon, computer-executable instructions which, when executed by a processor, cause the processor to execute operations, the operations comprising:

calculating an interpolation position that is a pixel position before image conversion corresponding to a pixel position after image conversion;

reading, from a memory circuit that stores input image data divided into a first block having pixel data of a predetermined number of pixels in a line direction for a first plurality of lines, a second block having pixel data of a predetermined number of pixels following the first block in the line direction for a second plurality of lines including a part of the first plurality of lines of the first block, and a third block having pixel data of a predetermined number of pixels following the first block in the line direction for a third plurality of lines including a line different from a line included in the second block in the first block, the pixel data of the first block, the pixel data of the second block, and the pixel data of the third block including pixel data of a peripheral pixel to be used in generating pixel data of the interpolation position; and generating, by interpolation processing using the pixel data of the peripheral pixel read from the memory circuit, the pixel data of the interpolation position.

* * * * *